(12) United States Patent
Ying et al.

(10) Patent No.: US 11,182,353 B2
(45) Date of Patent: Nov. 23, 2021

(54) STORED-PROCEDURE EXECUTION METHOD AND DEVICE, AND SYSTEM

(71) Applicant: Huawei Technologies Co., Ltd., Shenzhen (CN)

(72) Inventors: Shanshan Ying, Shenzhen (CN); Junhua Zhu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 146 days.

(21) Appl. No.: 16/458,684

(22) Filed: Jul. 1, 2019

(65) Prior Publication Data

US 2019/0324952 A1   Oct. 24, 2019

Related U.S. Application Data

(63) Continuation of application No. PCT/CN2016/113845, filed on Dec. 30, 2016.

(51) Int. Cl.
*G06F 16/21* (2019.01)
*G06F 16/2455* (2019.01)
*G06F 16/242* (2019.01)

(52) U.S. Cl.
CPC ............ *G06F 16/21* (2019.01); *G06F 16/244* (2019.01); *G06F 16/24552* (2019.01)

(58) Field of Classification Search
None
See application file for complete search history.

(56) References Cited

U.S. PATENT DOCUMENTS

| 6,073,129 | A  | * | 6/2000 | Levine ................. G06F 16/235 |
| 6,081,801 | A  |   | 6/2000 | Cochrane et al. |
| 6,507,834 | B1 |   | 1/2003 | Kabra et al. |
| 6,507,903 | B1 |   | 1/2003 | Beatty, III et al. |
| 9,128,990 | B2 |   | 9/2015 | Teletia et al. |

(Continued)

FOREIGN PATENT DOCUMENTS

| CN | 1330321 A   | 1/2002 |
| CN | 101093454 A | 12/2007 |

(Continued)

OTHER PUBLICATIONS

Machine Translation and Abstract of Chinese Publication No. CN101980207, Feb. 23, 2011, 14 pages.

(Continued)

*Primary Examiner* — Son T Hoang
(74) *Attorney, Agent, or Firm* — Conley Rose, P.C.

(57) ABSTRACT

A method includes receiving an execution request, where the execution request is used to request to execute a task including at least two stored procedures, requesting at least two threads, and dispatching each stored procedure in the task to one of the at least two threads for execution, receiving Structured Query Language (SQL) statements sent by the at least two threads when the at least two threads execute the stored procedures included in the task, and grouping and caching the received SQL statements based on a same access characteristic, and for an SQL statement cache group that satisfies a preset trigger condition, calling an SQL statement execution engine to execute an SQL statement in the SQL statement cache group.

20 Claims, 8 Drawing Sheets

(56) References Cited

U.S. PATENT DOCUMENTS

| | | | |
|---|---|---|---|
| 2003/0066053 A1* | 4/2003 | Al-Azzawe | G06F 16/21 707/999.1 |
| 2004/0193807 A1* | 9/2004 | Mogi | G06F 16/20 707/E17.005 |
| 2006/0271557 A1* | 11/2006 | Harward | G06F 16/24552 |
| 2016/0299982 A1 | 10/2016 | Bhave et al. | |
| 2016/0371123 A1* | 12/2016 | Zhang | G06F 16/903 |
| 2017/0286485 A1* | 10/2017 | Chandramouli | G06F 16/245 |
| 2017/0289059 A1* | 10/2017 | Wu | G06F 16/90 |

FOREIGN PATENT DOCUMENTS

| | | | |
|---|---|---|---|
| CN | 101980207 A | | 2/2011 |
| CN | 102508716 A | | 6/2012 |
| CN | 102945256 A | | 2/2013 |
| CN | 103617273 A | | 3/2014 |
| CN | 104142941 A | | 11/2014 |
| CN | 104391895 A | | 3/2015 |
| CN | 105279276 A | | 1/2016 |
| CN | 105528371 A | | 4/2016 |
| CN | 106156174 A | | 11/2016 |
| WO | 2014150098 A1 | | 9/2014 |
| WO | 2015165385 A1 | | 11/2015 |

OTHER PUBLICATIONS

Machine Translation and Abstract of Chinese Publication No. CN102508716, Jun. 20, 2012, 14 pages.
Machine Translation and Abstract of Chinese Publication No. CN102945256, Feb. 27, 2013, 8 pages.
Machine Translation and Abstract of Chinese Publication No. CN103617273, Mar. 5, 2014, 7 pages.
Machine Translation and Abstract of Chinese Publication No. CN104391895, Mar. 4, 2015, 8 pages.
Machine Translation and Abstract of Chinese Publication No. CN105279276, Jan. 27, 2016, 10 pages.
Machine Translation and Abstract of Chinese Publication No. CN106156174, Nov. 23, 2016, 13 pages.
Foreign Communication From a Counterpart Application, PCT Application No. PCT/CN2016/113845, English Translation of International Search Report dated Oct. 10, 2017, 3 pages.
Foreign Communication From a Counterpart Application, PCT Application No. PCT/CN2016/113845, English Translation of Written Opinion dated Oct. 10, 2017, 3 pages.

* cited by examiner

STORED-PROCEDURE EXECUTION METHOD AND DEVICE, AND SYSTEM

CROSS-REFERENCE TO RELATED APPLICATIONS

This application is a continuation of International Application No. PCT/CN2016/113845, filed on Dec. 30, 2016, the disclosure of which is hereby incorporated by reference in its entirety.

TECHNICAL FIELD

The present disclosure relates to the field of database technologies, and in particular, to a stored-procedure execution method and device, and a database management system.

BACKGROUND

A stored procedure (SP) is a subroutine that can be called by an application. The stored procedure includes a set of statements that are used for completing a specific function and that include a Structured Query Language (SQL) statements and procedural statements (for example, a logic control statement, a variable assignment statement, and an expression arithmetic statement). The stored procedure is usually stored in a database (DB). A created stored procedure merely needs to be compiled once, and the stored procedure can be subsequently called by specifying a name and a parameter of the stored procedure. After execution of the stored procedure ends, a result set is returned. The result set can be used by another stored procedure or can be used by an application.

Compared with the SQL statement, the stored procedure has characteristics of low network traffic, high code reusability, excellent security performance, high execution efficiency, and the like. Therefore, the stored procedure is widely applied to a database system. In the prior art, during execution of a stored procedure, a thread needs to be dispatched to the stored procedure. The thread sequentially executes statements of the stored procedure. When executing a program statement, the thread calls a program statement executor in a database management system to execute the program statement. When executing an SQL statement, the thread calls an SQL execution engine in the database management system to execute the SQL statement. The thread is in a waiting state during waiting for an execution result of the SQL statement. After receiving the execution result of the SQL statement, the thread is woken up and continues to execute another statement of the stored procedure.

It can be learned from the foregoing that an execution mode used in the prior art has low efficiency and is not applicable to execution of a task including a plurality of stored procedures. For example, when a user uses a credit card for consumption, a process of determining, by a database management system, whether a transaction is risky involves calling of thousands of stored procedures. In order not to affect user experience, the system has an extremely high latency requirement for this determining process. Therefore, during execution of the task including the plurality of stored procedures, how to improve execution efficiency of such a task becomes a problem to be resolved urgently.

SUMMARY

In view of this, embodiments of the present disclosure provide a stored-procedure execution method and device, and a database management system, to improve execution efficiency of a task including a plurality of stored procedures.

According to an aspect, an embodiment of the present disclosure provides a stored-procedure execution method, applied to a database management system. Representative data management systems include ORACLE, MICROSOFT SQL SERVER, ACCESS, MYSQL, POSTGRESQL, and the like. The execution method includes receiving an execution request, where the execution request is used to request to execute a task including at least two stored procedures, requesting at least two threads, and dispatching each stored procedure in the task to one of the at least two threads for execution, receiving SQL statements sent by the at least two threads when the at least two threads execute the stored procedures included in the task, and grouping and caching the received SQL statements based on a same access characteristic, and for an SQL statement cache group that satisfies a preset trigger condition, calling an SQL statement execution engine to execute an SQL statement in the SQL statement cache group. According to the foregoing manner, the task including the at least two stored procedures is executed using a plurality of threads. This can increase a processing speed of the stored procedures. The SQL statements having the same access characteristic are cached by group such that when the preset trigger condition is satisfied, the SQL statement execution engine is called to execute, in batches, statements that are in an SQL cache group and that satisfy the preset trigger condition to improve execution efficiency of the plurality of stored procedures.

In a possible design, the foregoing grouping may be performed using a data structure of a type such as a queue. In an implementation, another data structure such as a stack and a linked list may alternatively be used to cache the SQL statement. An implementation of grouping the SQL statements based on a same access characteristic is creating different SQL statement cache queues based on different SQL statement access characteristics, and determining an access characteristic of the received SQL statement, and caching the received SQL statement to an SQL statement cache queue having an access characteristic same as that of the received SQL statement. The received SQL statements are cached to a queue based on the same access characteristic, to make preparation for subsequent batch processing of SQL statements having the same access characteristic.

In a possible design, the SQL statement access characteristic includes a to-be-accessed table. For SQL statements accessing a same table, the SQL statements are cached to a same group. The SQL execution engine executes in parallel a plurality of SQL statements accessing a same table. This reduces access overheads caused by accessing different tables by the plurality of SQL statements, and improves execution efficiency of the SQL statements.

In a possible design, the SQL statement access characteristic further includes a common expression in an SQL statement. Because there is a same common expression, after an operation of the same common expression ends, another SQL statement may use an operation result of the same common expression. This improves overall execution efficiency of a plurality of SQL statements having the same common expression.

In another possible design, the preset trigger condition is used to determine when to call the SQL execution engine to execute a plurality of cached SQL statements. In consideration that a quantity of cached SQL statements in an SQL statement group created based on a same access characteristic may grow over time, the trigger condition may be set based on duration of the SQL statement group (a period of time after the group is created) or the quantity of the SQL statements. In an embodiment, the duration of the SQL statement cache queue reaches a specified time threshold, or a quantity of SQL statements in the SQL statement cache queue reaches a specified quantity threshold. These two preset trigger conditions can be used to trigger calling of the SQL statement execution engine based on the time threshold or the quantity threshold of the SQL statements, and are two commonly used triggering modes. The specified time threshold and the specified quantity threshold may be set by an administrator of the database management system based on experience.

In another possible design, the preset trigger condition is that a quantity of SQL statements in the SQL statement cache queue reaches a specified quantity threshold, and duration of the SQL statement cache queue does not exceed a specified time threshold. According to this implementation, compared with a triggering mode of merely setting a quantity threshold, the following problem can be avoided. Because there is an excessively small quantity of SQL statements having a specific access characteristic, execution of the SQL statements cannot be triggered. This improves robustness of the solution of the execution method embodiment of the present disclosure.

In another possible design, the method further includes receiving procedural statements sent by the at least two threads when the at least two threads execute the stored procedures included in the task, and calling a procedural statement executor to execute the procedural statements. During execution of the stored procedure, in addition to execution of the SQL statement, execution of the procedural statement (for example, a logic control statement, a variable assignment statement, and an expression operation statement) is included. In this embodiment of the present disclosure, execution is performed using a procedural statement executor in the database management system.

In another possible design, the method further includes, when the SQL statements sent by the at least two threads when the at least two threads execute the stored procedures included in the task are received, and the received SQL statements are cached, recording a correspondence between the SQL statement and an execution thread, where the execution thread is a thread executing a stored procedure to which the SQL statement belongs. The correspondence between the cached SQL statement and an execution thread is recorded, and after execution of the SQL statement is completed, an execution result of the SQL statement can be returned to the corresponding execution thread such that the thread can be woken up to execute another part of the stored procedure to which the SQL statement belongs.

In another possible design, the method further includes, after an execution result returned by the SQL statement execution engine after the SQL statement execution engine executes the SQL statement included in the task is received, returning, based on the correspondence between the to-be-executed SQL statement and an execution thread, the execution result to the execution thread corresponding to the SQL statement such that the thread can be woken up to execute another part of the stored procedure to which the SQL statement belongs.

In another possible design, the method further includes returning an execution result of the SQL statement and an execution result of the procedural statement to a thread executing the stored procedure, to complete an execution process of the entire stored procedure. The execution results of the stored procedure are returned to a client calling the stored procedure or another stored procedure.

According to another aspect, an embodiment of the present disclosure provides a stored-procedure execution device, where the execution device may be a part of a database management system running on computer hardware (including a processor, a memory, a hard disk, and the like). The execution device includes a receiving unit, configured to receive an execution request, where the execution request is used to request to execute a task including at least two stored procedures, a scheduling unit, configured to request at least two threads, and dispatch each stored procedure in the task to one of the at least two threads for processing, a cache unit, configured to receive SQL statements sent by the at least two threads when the at least two threads execute the stored procedures included in the task, and group and cache the received SQL statements based on a same access characteristic, and an SQL call execution unit, configured to, for an SQL statement cache group that satisfies a preset trigger condition, call an SQL statement execution engine to execute an SQL statement in the SQL statement cache group. According to the execution device, the at least two stored procedures can be dispatched to the at least two threads for parallel execution, and the SQL statements are grouped and cached based on the same access characteristic. When the trigger condition is satisfied, the SQL statements satisfying the same access characteristic are sent together to the SQL statement execution engine. This can speed up execution of the SQL statements, thereby improving overall execution efficiency of the at least two stored procedures.

In a possible design, the cache unit includes a queue creation module, configured to create different SQL statement cache queues based on different SQL statement access characteristics, and a storage operation module, configured to determine an access characteristic of the received SQL statement, and cache the received SQL statement to an SQL statement cache queue having an access characteristic same as that of the received SQL statement. The cache unit may be implemented by a memory controller and a memory. The memory controller requests, in the memory, an area as a cache space of the SQL statements. The memory controller may create different SQL statement cache queues in the cache space based on different access characteristics, and when receiving an SQL statement, the memory controller analyzes an access characteristic of the SQL statement, and caches the SQL statement to an SQL statement cache queue having a characteristic same as that of the SQL statement.

In a possible design, the SQL statement access characteristic includes a to-be-accessed table.

In a possible design, the SQL statement access characteristic further includes a common expression in an SQL statement.

In another possible design, the preset trigger condition is used to determine when to call an SQL execution engine to execute a plurality of cached SQL statements. In consideration that a quantity of cached SQL statements in an SQL statement group created based on a same access characteristic may grow over time, the trigger condition may be set based on duration of the SQL statement group (a period of time after the group is created) or the quantity of the SQL statements. In an embodiment, the duration of the SQL statement cache queue reaches a specified time threshold, or a quantity of SQL statements in the SQL statement cache queue reaches a specified quantity threshold. These two preset trigger conditions can be used to trigger calling of the SQL statement execution engine based on the time threshold or the quantity threshold of the SQL statements, and are two commonly used triggering modes. The specified time threshold and the specified quantity threshold may be set by an administrator of the database management system based on experience.

In a possible design, the preset trigger condition includes that duration of the SQL statement cache queue reaches a specified time threshold, or a quantity of SQL statements in the SQL statement cache queue reaches a specified quantity threshold. In another possible design, the preset trigger condition is that a quantity of SQL statements in the SQL statement cache queue reaches a specified quantity threshold, and duration of the SQL statement cache queue does not exceed a specified time threshold. According to this implementation, compared with a triggering mode of merely setting a quantity threshold, the following problem can be avoided. Because there is an excessively small quantity of SQL statements having a specific access characteristic, execution of the SQL statements cannot be triggered. This improves robustness of the solution of the execution method embodiment of the present disclosure.

In a possible design, the execution device further includes a procedure call execution unit, configured to receive procedural statements sent by the at least two threads when the at least two threads execute the stored procedures included in the task, and call a procedural statement executor to execute the procedural statements. The procedure call execution unit is a component of a database engine, and is configured to execute the procedural statement (for example, a logic control statement, a variable assignment statement, and an expression operation statement), where an execution result is returned to a thread executing the stored procedure.

In another possible design, the cache unit further includes a mapping relationship record module, configured to, when the SQL statements sent by the at least two threads when the at least two threads execute the stored procedures included in the task are received, and the received SQL statements are grouped and cached based on the same access characteristic, record a correspondence between the SQL statement and an execution thread, where the execution thread is a thread executing a stored procedure to which the SQL statement belongs. The mapping relationship record module may be implemented by a memory controller, configured to provide an area in a memory space for storing the correspondence between the SQL statement and an execution thread, where the correspondence may be recorded using a data structure such as a table.

In another possible design, the SQL call execution unit is further configured to, after an execution result returned by the SQL statement execution engine after the SQL statement execution engine executes the SQL statement included in the task is received, return, based on the correspondence between the to-be-executed SQL statement and an execution thread, the execution result to the execution thread corresponding to the SQL statement.

In another possible design, the SQL call execution unit returns an execution result of the SQL statement and the procedure call execution unit returns an execution result of the procedural statement to a thread executing the stored procedure such that the thread can obtain a result of the stored procedure based on the execution results of the statements, to complete an execution process of the entire stored procedure. For execution of the task including the at least two stored procedures, after execution of each stored procedure is completed, a thread processing the stored procedure obtains an execution result of the stored procedure, and after the at least two stored procedures included in the task are all executed, an execution result of the task can be finally obtained based on the execution results of these stored procedures.

According to still another aspect, an embodiment of the present disclosure further provides a database management system, including a processor, a memory, a communications interface, and a bus, where the processor, the memory, and the communications interface communicate with each other using the bus, and the memory is configured to store an execution instruction, the communications interface is configured to communicate with a client, and when the client sends an execution request, and the execution request is used to request to execute at least two stored procedures, the processor executes the execution instruction stored in the memory such that the database management system executes the execution method according to any implementation of the first aspect.

According to yet another aspect, an embodiment of the present disclosure provides a computer program product, where the computer program product includes computer program code, and when the computer program code is executed by a computer, the computer program code may enable the computer to execute steps of the execution method according to any implementation of the first aspect.

According to still yet another aspect, an embodiment of the present disclosure provides a computer readable storage medium, where the computer stores computer program code, and when the computer program code is executed by a computer, the computer program code may enable the computer to execute steps of the execution method according to any implementation of the first aspect.

Compared with the prior art, the solutions provided in the present disclosure can improve execution efficiency of a plurality of stored procedures to a relatively great extent.

BRIEF DESCRIPTION OF DRAWINGS

The following briefly describes the accompanying drawings required for describing embodiments or the prior art.

DESCRIPTION OF EMBODIMENTS

Figure 1A:
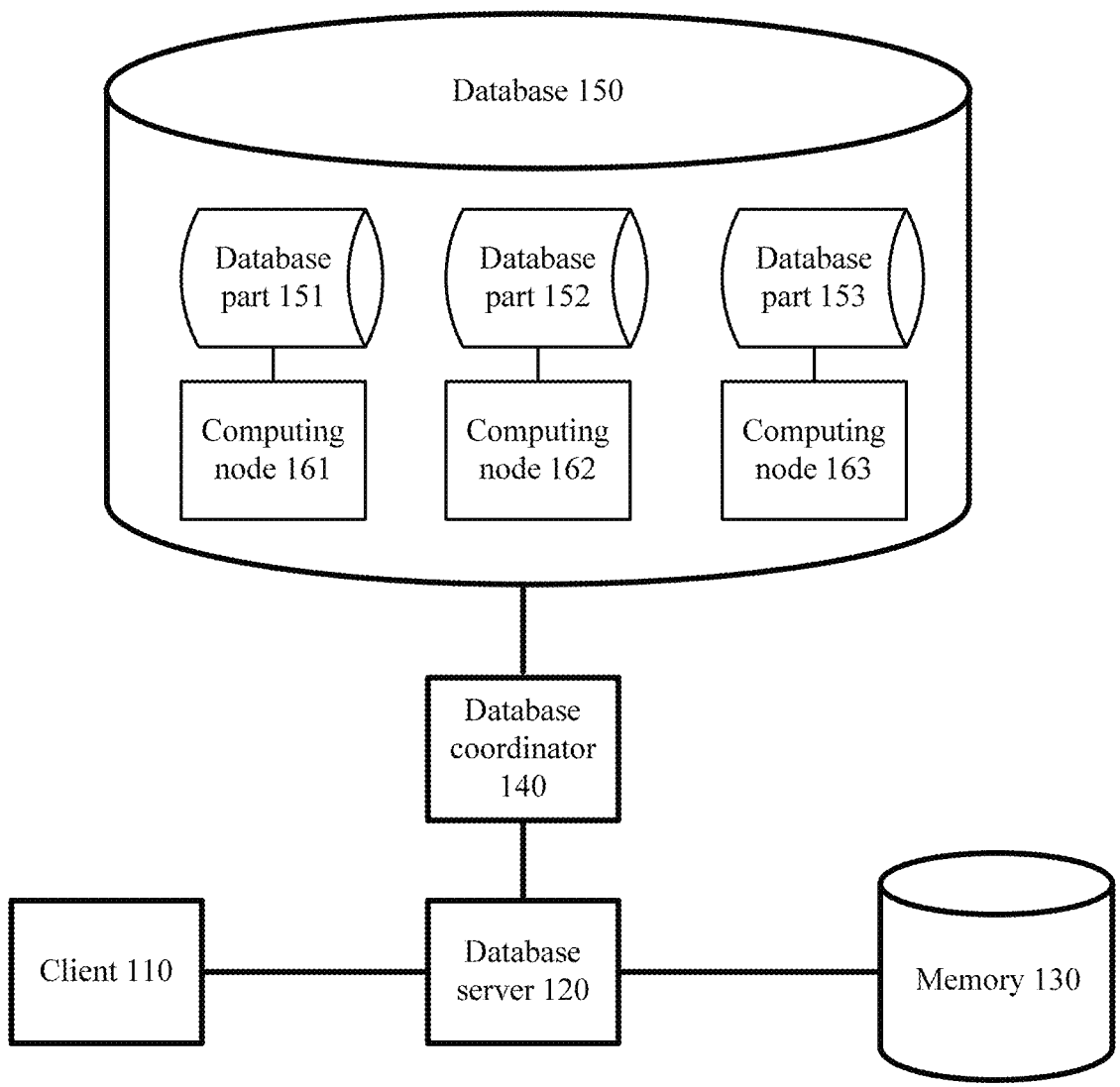
FIG. 1A is a schematic diagram of a computer architecture to which an embodiment of the present disclosure is applied.

The following clearly describes the technical solutions in the embodiments of the present disclosure with reference to the accompanying drawings.

A system architecture and a service scenario described in the embodiments of the present disclosure are used to describe the technical solutions in the embodiments of the present disclosure more clearly, and do not constitute limitations to the technical solutions in the embodiments of the present disclosure. A person of ordinary skill in the art may know that with evolution of a system architecture and emergence of a new service scenario, the technical solutions in the embodiments of the present disclosure are also applicable to similar technical issues.

The embodiments of the present disclosure may include or use a special-purpose computer or a general-purpose computer. The general-purpose computer includes computer hardware, for example, one or more processors and a memory. The embodiments of the present disclosure further include a computer readable medium storing a computer readable instruction and a data structure. The computer readable medium may be any type of available medium that can be accessed by a general-purpose computer system or a special-purpose computer system. The computer readable medium storing a computer executable instruction is a computer storage medium (device). The computer readable medium implementing the computer executable instruction is a transmission medium. Therefore, as an example instead of a limitation, the embodiments of the present disclosure may include at least two completely different types of computer readable media, the computer storage medium (device) and the transmission medium.

The computer storage medium includes a random access memory (RAM), a read-only memory (ROM), an electrically erasable programmable read-only memory(EEPROM), a compact disc read-only memory (CD-ROM), an solid state disk (SSD), a flash memory, a phase change memory (PCM), and another type of main memory, optical disc storage, disk memory, or any type of storage medium in which a computer executable instruction or a data structure exists and that can store computer code, and the computer executable instruction or data structure can be accessed by a general-purpose computer or a special-purpose computer.

A "network" is defined as one or more data connections that are between computer systems, or modules, or other electronic devices and that can be used to transmit electronic data. When information is transmitted (may be in a wired mode, a wireless mode, or a combination of a wired mode and a wireless mode) to a computer using a network or another type of communication connection, the connection is considered as a transmission medium by the computer. The transmission medium includes program code that can be carried by a network and/or a data connection and that exists in a form of a computer executable instruction or a data structure, and the program code can be accessed by a general-purpose computer and a special-purpose computer. A combination of the foregoing media should also be included within a range of the computer readable medium.

In addition, upon arriving at various computer system components, a program code apparatus in a form of a computer executable instruction or a data structure can be automatically transmitted from the transmission medium to the computer storage medium (device). For example, a computer executable instruction or a data structure received using a network or a data connection may be cached in a RAM of a network interface module (for example, a network interface controller (NIC)), and then be transmitted to a main memory of a computer system and/or a non-volatile computer storage medium (device) in the computer system. Therefore, it should be understood that the computer storage medium (device) may be included in a computer system component that also uses the transmission medium.

The computer executable instruction includes an instruction and data that enable, when being executed by a processor, a general-purpose computer, a special-purpose computer, or a special-purpose processing device to execute a function or a group of functions. The computer executable instruction may be, for example, binary code, or an intermediate format instruction such as an assembly language, or source code. Although the subject matter has been described in a language specific to structural characteristics and/or methodological acts, it should be understood that the subject matter defined in the appended claims is unnecessarily limited to the foregoing characteristics and acts. Instead, the characteristics and the acts are disclosed as example forms for implementing the claims.

A person skilled in the art may understand that the present disclosure may be practiced in a network computing environment having many types of computer system configurations, and the computer system configurations include a personal computer, a desktop computer, a notebook computer, a message processor, a handheld device, a multiprocessor system, a microprocessor-based or programmable consumer electronic device, a network personal computer (PC), a small computer, a mainframe computer, a mobile phone, a personal digital assistant (PDA), a tablet computer, a pager, a router, a switch, and the like. The present disclosure may also be implemented in a distributed system environment. In the distributed system environment, each of a local computer system and a remote computer system connected using a network (using a wired data link, a wireless data link, or a combination of a wired link and a wireless link) executes a task. In the distributed system environment, a program module may be located in a local memory and/or a remote storage device.

The embodiments of the present disclosure may also be implemented in a cloud computing environment. In the embodiments of the present disclosure, "cloud computing" is defined as a model used to allow on-demand network access to a shared configurable computing resource pool. For example, the cloud computing can be deployed by an operator or a service provider to provide configurable and on-demand access to a shared computing resource pool. The shared computing resource pool includes a processor resource, a storage resource, and a network resource. These resources can be configured through virtualization for use, and after a service is completed, these resources can be released through interaction with the operator or the service provider such that management and maintenance of computing resources are more flexible and simple.

A cloud computing model may include various characteristics such as on-demand self-service, broad network access, resource pooling, and rapid flexibility, and measured service. The cloud computing model may also present various service models such as a software as a service (SAAS) model, a platform as a service (PAAS) model, and an infrastructure as a service (IAAS) model. The cloud computing model may also be deployed using different deployment models such as a private cloud model, a community cloud model, a public cloud model, and a hybrid cloud model.

Operating environment of the embodiments of the present disclosure.

FIG. 1A shows a schematic computer architecture 100 that is used for stored-procedure creation and execution and that is applied to the embodiments of the present disclosure. The computer architecture 100 includes a client 110, a database server 120, a memory 130, a database coordinator 140, and a database 150. The client 110, the database server 120, the memory 130, the database coordinator 140, and the database 150 may be connected to each other using a network (or form a part of a network). The network is, for example, a local area network (LAN), a wide area network (WAN), or the Internet. The client 110, the database server 120, the memory 130, the database coordinator 140, and the database 150, as well as any other connected computer systems and components of the other connected computer systems, each can create a message including related data and exchange these messages using the network (for example, an Internet Protocol (IP) datagram and another higher-layer protocol using the IP datagram, such as the Transmission Control Protocol (TCP), the Hypertext Transfer Protocol (HTTP), or the Simple Mail Transfer Protocol (SMTP), or using another non-datagram protocol).

The client 110 may be a database client. The client 110 may provide a user interface used to exchange data stored in the database 150. With reference to the embodiments of the present disclosure, in a stored-procedure creation phase, the client 110 sends a stored-procedure creation request to the database server 120. The stored-procedure creation request may include a name used by a to-be-created stored procedure and a stored-procedure statement that is included in the stored procedure and that needs to be executed. In a stored-procedure execution phase, the client 110 may send an execution request for a plurality of stored procedures. The execution request carries a name and a parameter of a to-be-called stored procedure. For example, FIG. 1A shows only one client 110. It can be understood that in an actual scenario, there may be a plurality of clients. With reference to the embodiments of the present disclosure, the execution request for the plurality of stored procedures that is sent by the client may be from one client, or may be from different clients. In an implementation, the client 110 may be an application program running on a computer, or may be a computer. This is not limited in the embodiments of the present disclosure.

In the stored-procedure creation phase, after receiving the stored-procedure creation request sent by the client 110, the database server 120 creates an executable process based on the stored-procedure statement sent by the client 110, and then the database server 120 may store the name of the stored procedure and the executable process in the memory 130. In the stored-procedure execution phase, when the stored-procedure execution request sent by the client 110 arrives at the database server 120, the database server 120 requests an operating system to allocate a processing resource, and after obtaining the processing resource, the database server 120 reads the to-be-executed stored procedure from the memory 130, to complete execution of the stored procedure. During actual execution, different execution manners are used for an SQL statement and a procedural statement that are included in the stored procedure. For the SQL statement, the database server 120 sends the SQL statement to the database coordinator 140, and the database coordinator 140 determines a database part related to the SQL statement and dispatches a computing node corresponding to the database part to execute the SQL statement, and the procedural statement is executed by a procedural statement executor component in the database server 120. In an implementation, the database server 120 is presented by a computer on which a database management system runs. The computer may be a stand-alone computer, or in cloud computing, may be a distributed virtual computer including a computing resource, a storage resource, and a network resource.

The database coordinator 140 is configured to receive an SQL statement execution request sent by the database server 120, determine a database part in which data included in the SQL statement execution request exists, and send the SQL statement execution request to a computing node corresponding to the database part such that the computing node completes execution of the SQL statement. The database coordinator 140 is implemented in various manners, for example, may be implemented as a stand-alone computer, or may be implemented as software or a software-and-hardware component integrated with the database server 140 in one computer device.

The database 150 includes a database part 151, a database part 152, and a database part 153, as well as a computing node 161, a computing node 162, and a computing node 163. For example, FIG. 1A shows only three database parts, where each database part is corresponding to one computing node. In an actual environment, depending on a size of the database and an actual requirement for deployment of the database, there may exist different quantities of database parts and different quantities of computing nodes. Therefore, the schematic example in FIG. 1A does not constitute a limitation to an implementation process of the embodiments of the present disclosure. The computing nodes 161, 162, and 163 may be configured in an architecture that shares nothing. Therefore, each of the computing nodes 161, 162, and 163 maintains a separate memory (for example RAM) and a separate storage resource (for example, a disk drive) from another node. The database 150 is distributed across the computing nodes 161, 162, and 163. The computing nodes maintain the database parts 151, 152, and 153, respectively. The database coordinator 120 may use a hardware or software component that performs abstraction on a distributed database such that the database 150 is presented to the client 110 as a stand-alone database. Therefore, the client may interact with the database 150 using a command compatible with the stand-alone database. It should be noted that the computing nodes corresponding to the database parts 151 to 153 have different implementations. When data in the database is physically stored in a distributed manner (in other words, different database parts are stored in different servers, and are physically distributed in different areas), these computing nodes may be considered as different server devices. When the data in the database is physically stored in a centralized manner (logically, there may be a plurality of database parts, and the plurality of database parts physically share one server device), these computing nodes may be considered as different processors in the server device or different threads in one processor.

Figure 1B:
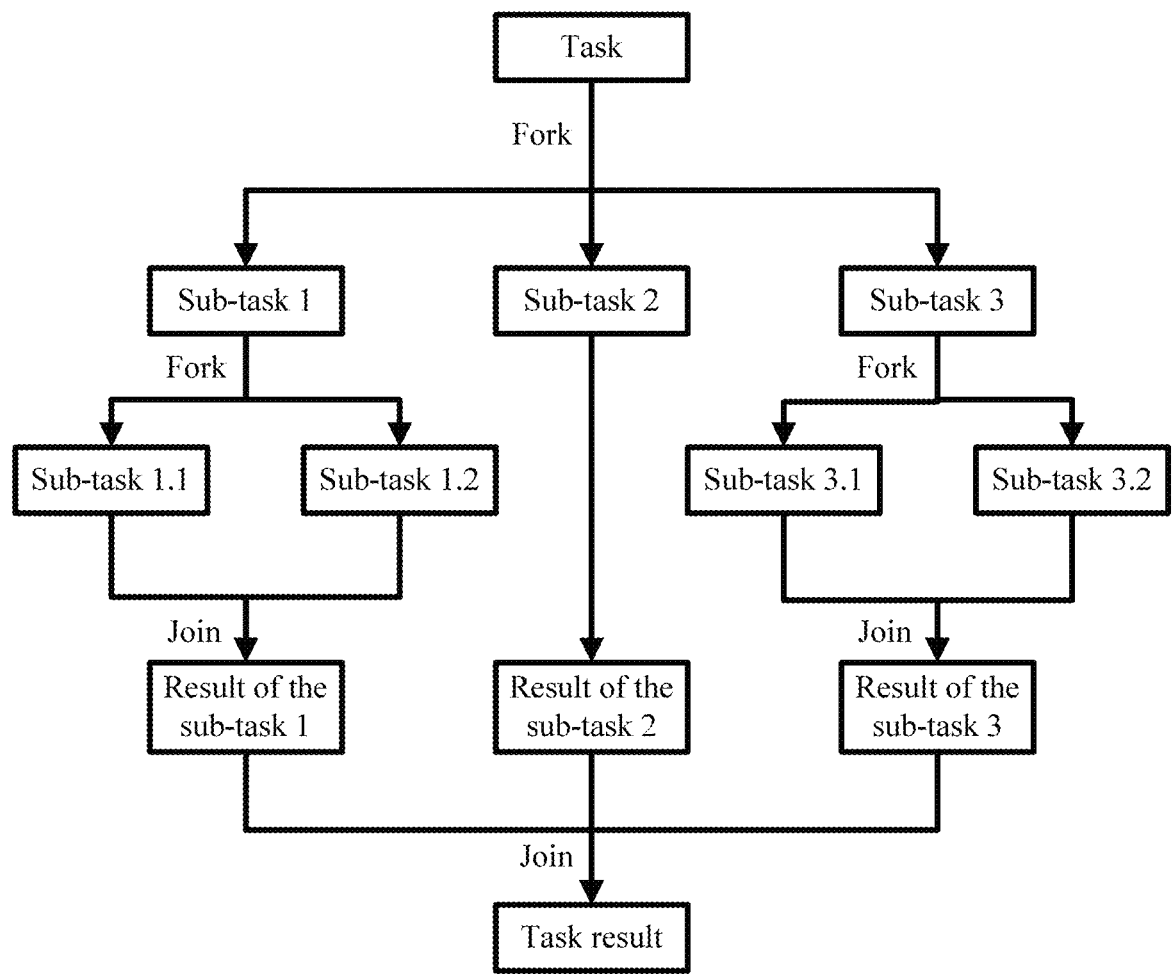
FIG. 1B is a schematic diagram of an example of distributed stored-procedure execution to which an embodiment of the present disclosure is applied.

For example, FIG. 1B shows a Fork-Join framework that is provided by JAVA 7 and that can execute tasks in parallel. In this framework, a task is divided into several sub-tasks, all sub-tasks may be executed in parallel, and finally execution results of all the sub-tasks are aggregated to obtain an execution result of the entire task. As shown in FIG. 1B, Fork means dividing a task into several sub-tasks for execution in parallel, and Join is to merge execution results of these sub-tasks to obtain a final task execution result. In the Fork phase, the sub-task obtained through division may still be quite large, and therefore the sub-task further needs to be segmented until sub-tasks obtained through segmentation are small enough. In the database field, some tasks may also be divided into several stored procedures based on a Fork-Join framework. These stored procedures are executed separately to obtain execution results of the stored procedures, and then the execution results are merged to obtain an execution result of these tasks. It should be noted that FIG.

1B and the text description for FIG. 1B are not only applicable to the Fork-Join framework in JAVA 7, but also applicable to another framework that follows distributed computing. Therefore, the foregoing description should not be construed as being applicable to only the Fork-Join framework. According to the distributed computing framework shown in FIG. 1B, in the present disclosure, a task including at least two stored procedures is divided into at least two stored procedures, and the at least two stored procedures are dispatched to a plurality of computing nodes (which may be understood as a plurality of processors, or may be understood as a plurality of threads of a processor) for processing, and processing results are assembled in a Join-like manner to obtain a processing result of the task.

In FIG. 1A, the database 150 included in the schematic computer architecture 100 that implements stored-procedure creation and stored-procedure execution is stored in a distributed manner and is accessed by a corresponding computing node. The computer architecture 100 is a currently common computer architecture. In consideration that this solution is not only applicable to such a currently common distributed database, but also applicable to a computer architecture that is in a form of a single server and whose database uses centralized storage and access, any embodiment of the present disclosure does not exclude this application.

Database Processing Architecture.

Figure 2:
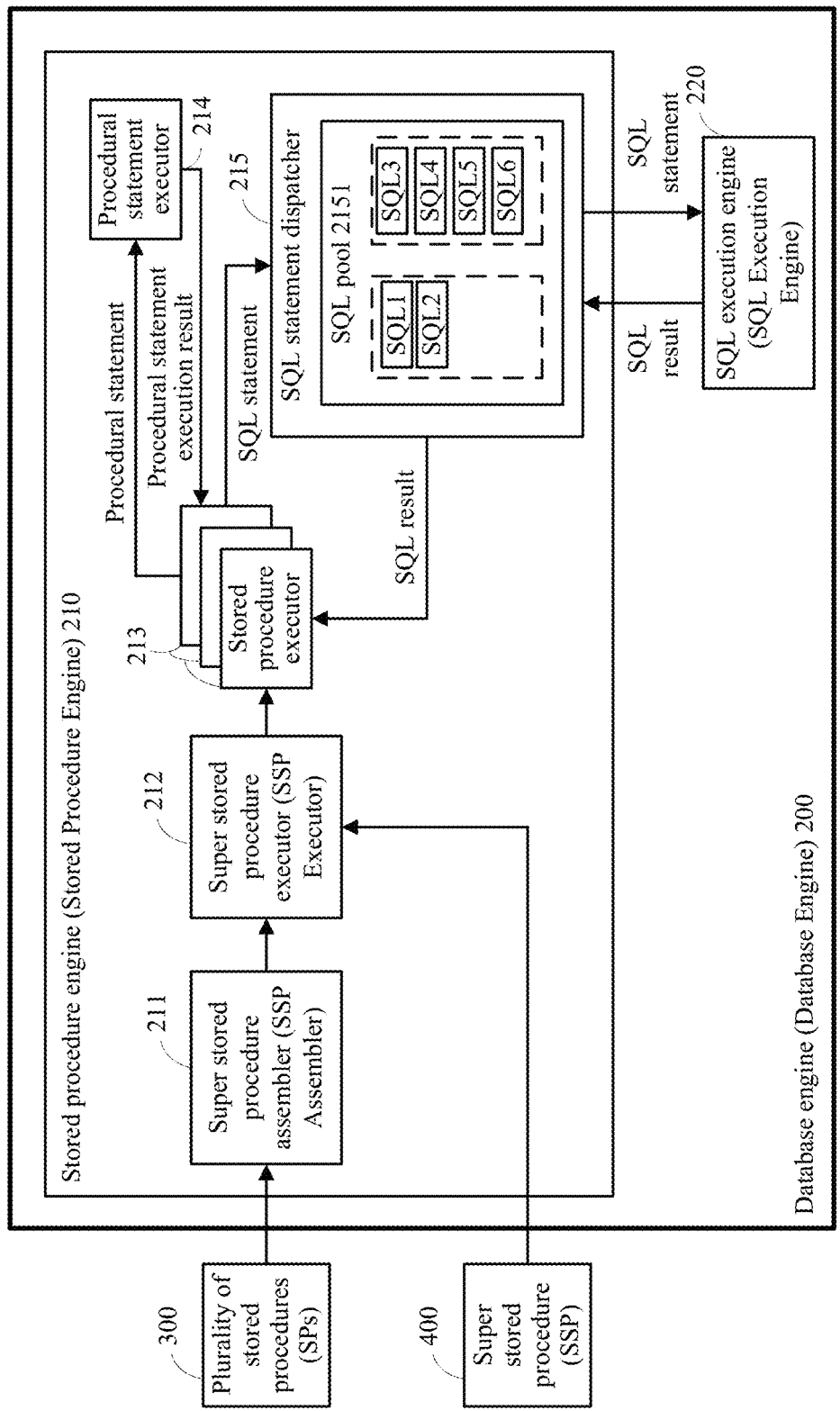
FIG. 2 is a schematic diagram of a database processing architecture to which an embodiment of the present disclosure is applied.

In terms of an execution process of a plurality of stored procedures, FIG. 2 shows a database processing architecture to which the embodiments of the present disclosure are applied. The database processing architecture includes a database engine (DB Engine) 200 and there are two forms of inputs, a plurality of stored procedures 300 and a super stored procedure (SSP) 400.

The database engine 200 is a composition part of a database management system (DBMS), and the database engine 200 can be configured to create data in a database, read the data from the database, update the data in the database, and delete the data from the database. These are create, read, update, and delete (CRUD) operations often executed on the data in the database. Most database management systems each include an application programming interface (API). These APIs can allow a user to interact with the database engine to operate the data in the database. With reference to the computer architecture 100 shown in FIG. 1A, the database engine 200 is corresponding to a component included in the database coordinator 140 and the database server 120.

The plurality of stored procedures 300 are used as a form of input in the solution of the embodiments of the present disclosure, and the plurality of stored procedures include at least two stored procedures. Execution requests of the plurality of stored procedures 300 may be sent by one client or by a plurality of clients. The stored procedure is usually created by the user. The user creates some relatively complex and possibly repeated operations as a stored procedure and compiles the stored procedure such that when the stored procedure is subsequently called, only a name and a parameter of the stored procedure need to be specified to call the stored procedure for execution. For example, the following is an illustrative example of creation code used for a stored procedure.

```
CREATE PROCEDURE example (p1 in long, p2 in long, p3 out long) AS
DECLARE
    var_a long,
BEGIN
    var_a: =0,
    UPDATE A set A.a2 = p2 WHERE A.a1 = p1,
    SELECT count (*) INTO var_a FROM A WHERE A.a1 = p1,
    IF (var_a > 10)
    THEN
        SELECT count (*) INTO p3 FROM A, B
        WHERE A.a1 = B. b1
    ELSE
        SELECT count (*) INTO p3 FROM A, C
        WHERE A.a1 = C.c1
    ENDIF
END,
```

It can be learned from the foregoing code that the stored procedure includes two input parameters (p1, p2) and one output parameter (p3), a program body of the stored procedure includes one variable initialization (var_a) statement, four SQL statement calls (one update statement, three select statements), and one IF-THEN-ELSE logic control statement.

Figure 3:
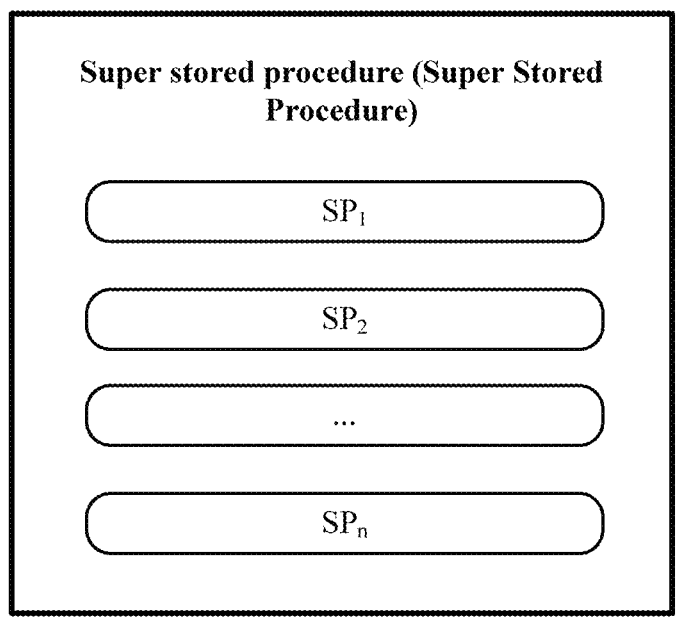
FIG. 3 is a schematic structural diagram of a super stored procedure according to an embodiment of the present disclosure.

The super stored procedure SSP 400 is a data structure defined in the solution of the embodiments of the present disclosure, that is, a combination of a plurality of stored procedures is referred to as a super stored procedure. Referring to FIG. 3, the SSP includes a list, that is, a set of parallel stored procedures, $SP_1$, $SP_2$, $SP_n$, where each $SP_i$ (i=1 . . . n) is corresponding to one stored procedure. There are the following two manners of generating an SSP.

(1) One manner is compiling the SSP by a user. For example, the user can compile the SSP using "a parallel keyword+a stored procedure". During creation of the stored procedure, the parallel keyword "parallel", for example, create parallel procedure, may be added, or to-be-called stored procedures may be dispatched to a plurality of groups, for example:

call parallel % ID % % procedure_name %.

Stored procedures having a same identifier (ID) may form a set of parallelizable stored procedures.

(2) The SSP is obtained by assembling, using a super stored procedure assembler (SSP Assembler), a set of stored procedures that can be executed in parallel.

Determining whether the plurality of stored procedures can be executed in parallel mainly depends on whether there is a read-write conflict or a read-read conflict between stored procedures to one niece of data. The following Table 1 is used as an example.

TABLE 1

| Stored procedure identifier | SQL statement |
|---|---|
| 1 | Select name from employee where id = 1, |
| 2 | Update employee set id = 2 where id = 1, |
| 3 | Select amount from sales where tid = 1002, |

The foregoing table includes three stored procedures. It is assumed that the three SQL statements belong to the three different stored procedures, respectively, and each stored procedure includes only one SQL statement. An SQL statement included in a stored procedure 1 is to read data of id=1 in an employee table. An SQL statement included in a stored procedure 2 is to update the data of id=1 in the employee table. An SQL statement included in a stored procedure 3 is to read data in a sales table. It can be learned from the foregoing three SQL statements that there is a read-write conflict between the SQL statement included in the stored procedure 1 and the SQL statement included in the stored procedure 2. If the stored procedure 1 and the stored procedure 2 are executed in parallel, obtained results are different when execution orders are different. Consequently, the results are uncertain. However, there is no read-write conflict between the stored procedure 1 and the stored procedure 3 and between the stored procedure 2 and the stored procedure 3 to a same piece of data, and therefore the stored procedure 1 and the stored procedure 3, as well as the stored procedure 2 and the stored procedure 3 can be executed in parallel.

It should be noted that, in an implementation, during execution of a task including at least two stored procedures, not all stored procedures can be executed in parallel. For example, there is a read-write conflict or write-write conflict between two or more stored procedures to one piece of data. For these stored procedures that cannot be executed in parallel, only a serial execution manner can be used. However, this does not affect beneficial effects of the embodiments of the present disclosure, and technical effects of improving execution efficiency of the plurality of stored procedures can be achieved, provided that these stored procedures that can be executed in parallel are assembled together for processing.

A stored procedure engine (SP Engine) 210 is configured to process the plurality of stored procedures 300 or the super stored procedure 400. The stored procedure engine 210 includes a super stored procedure assembler (SSP Assembler) 211, a super stored procedure executor (SSP Executor) 212, a super stored procedure executor (SP Executor) 213, a procedural statement executor (PS Executor) 214, an SQL statement dispatcher 215, and an SQL execution engine 220.

(A) The super stored procedure assembler (SSP Assembler) 211 is configured to assemble the entered plurality of stored procedures 300 into one super-stored-procedure data structure (as shown in FIG. 3). With reference to the computer architecture 100 shown in FIG. 1A, the super stored procedure assembler 211 is a component of the database server 120.

(B) The super stored procedure executor (SSP Executor) 212 is configured to execute the entered super stored procedure 400 or a super stored procedure obtained by assembly by the super stored procedure assembler 211. In an embodiment, the super stored procedure executor 212 is configured to request a thread resource from an operating system of a computer system, and the operating system dispatches currently available threads to the super stored procedure executor 212 after receiving the request. After receiving the dispatched threads (at least two threads), similar to the Fork-Join architecture shown in FIG. 1B, the super stored procedure executor 212 divides the stored procedures included in the super stored procedure into several sub-tasks with each including one or more stored procedures, and the super stored procedure executor 212 schedules the several sub-tasks to the dispatched threads for execution. With reference to the computer architecture 100 shown in FIG. 1A, the super stored procedure executor 212 is a component of the database server 120.

(C) The stored procedure executor (SP Executor) 213 is configured to execute the entered stored procedures. In terms of software, one or more stored procedure executor instances need to be created in the system. When the super stored procedure executor executes a plurality of stored procedures in parallel using a plurality of threads, one thread is corresponding to one stored procedure executor instance. When a thread 1 executes an SQL statement of a first stored procedure, the thread 1 sends the SQL statement to the SQL statement dispatcher 215 for caching, and then waits for an execution result of the SQL statement. In this case, the thread 1 executing the first stored procedure is in a waiting state, and a resource (such as a CPU) occupied by the thread is allocated to another thread (for example, a thread 2) to execute another stored procedure (for example, a second stored procedure). When the execution result of the foregoing SQL statement is returned, the thread 1 in the waiting state requests a resource (for example, the CPU) again to request for execution, to execute another statement (an SQL statement or a procedural statement) in the first stored procedure. When executing an SQL statement, the stored procedure executor 213 sends the to-be-executed SQL statement to the SQL statement dispatcher 215, and the SQL statement dispatcher 215 schedules the SQL statement and sends the SQL statement to the SQL execution engine 220 for execution. When executing a procedural statement, the stored procedure executor 213 sends the procedural statement to the procedural statement executor 214 for execution. With reference to the computer architecture 100 shown in FIG. 1A, the stored procedure executor 213 is a component of the database server 120.

For example, it is assumed that there is a super stored procedure including 1000 stored procedures. If the SSP executor 212 requests 20 threads, 50 stored procedures are evenly dispatched to each thread. In this case, the SSP executor 212 creates a stored procedure executor 213 instance for each thread. These instances are responsible for execution of stored procedures within the threads.

(D) The procedural statement executor (PS Executor) 214 is configured to execute another statement different from the SQL statement in the stored procedure, including but not limited to, a logic control statement, a variable assignment statement, an expression arithmetic statement, and the like. After the procedural statement executor executes a procedural statement, an execution result is returned to the corresponding stored procedure executor 213. With reference to the computer architecture 100 shown in FIG. 1A, the procedural statement executor 214 is a component of the database server 120.

For execution of the procedural statement, different compilers have different syntax definitions and different parsing manners. However, a processing process can be generally divided into syntax analysis, semantic analysis, and statement execution.

"a+b" computing is used as an example. Three steps may be performed.

(1) Syntax analysis: Determine whether a syntax definition is satisfied. For example, "a+" is an incomplete expression.

(2) Semantic analysis: Check a variable and a type. For example, whether variables "a" and "b" are defined, and whether "a" and "b" are data of a same type.

(3) Statement execution: Through syntax analysis and semantic analysis, the foregoing operation expression has become an internal expression form that can be recognized by the executor. The executor knows that "a+b" is an addition operation, where a first operator is a, and a second operator is b, obtains values of the variables a and b, calls the addition operation, and then returns a result (for example, assigning a value to an intermediate variable, or directly returning the result).

(E) The SQL statement dispatcher 215 is configured to receive an SQL statement sent by each stored procedure executor 213 and put the SQL statement into an SQL pool 2151. With reference to the computer architecture 100 shown in FIG. 1A, the SQL statement dispatcher 215 is a component of the database coordinator 140.

In an embodiment, the SQL statement dispatcher 215 creates different SQL statement cache queues based on different SQL statement access characteristics. Based on an access characteristic of a received SQL statement, the SQL statement dispatcher 215 caches the received SQL statement to an SQL statement cache queue having an access characteristic same as that of the received SQL statement.

Further, the SQL statement access characteristic includes a to-be-accessed table. In other words, a plurality of SQL statements access a same table. For example, for the plurality of SQL statements, table names behind FROM substatements of the SQL statements are identical. Because the plurality of SQL statements access the same table, when the plurality of SQL statements are executed using the SQL execution engine, access overheads caused by accessing a plurality of tables are reduced, and execution efficiency of the SQL statements is improved.

Further, if the same table is accessed, the SQL statement access characteristic further includes a common expression in an SQL statement. The common expression is a same operation expression in SQL statements. For example, two SQL statements in Table 2 below access a same table employee and have a same expression: salary>5000.

TABLE 2

| SQL statement ID | SQL statement |
|---|---|
| 1 | Select name from employee where salary > 5000 |
| 2 | Select name from employee where age > 20 and salary > 5000 |

It can be learned from Table 2 that during execution of a second SQL statement, an execution result of a first SQL statement can be used, that is, during execution of the second SQL statement, only a record of age>20 needs to be selected from the execution result (including a plurality of records) of the first SQL statement to obtain an execution result of the second SQL statement. This improves execution efficiency of the second SQL statement.

For example, if there are 200 SQL statements, 100 SQL statements access an EMP table, and the other 100 SQL statements access a department (DEPT) table, the 200 SQL statements may be divided into two cache queues based on different access tables, and SQL statements in each cache queue access a same table. For another example, tables are accessed in an unbalanced manner by SQL statements included in an SQL pool, for example, among 1000 SQL statements, 900 SQL statements access an EMP table, and 100 SQL statements access a DEPT table. Because a quantity of SQL statements accessing the EMP table is quite large, there is an extremely long execution delay caused during execution of the 900 SQL statements accessing the EMP table. Therefore, the 900 SQL statements accessing the EMP table can be subdivided based on an access characteristic. For example, among the 900 SQL statements accessing the EMP table, 300 SQL statements access data corresponding to salary>5000, 300 SQL statements access data corresponding to age>20, and 300 SQL statements access data corresponding to ID number>450. In this case, the 900 SQL statements can be grouped based on the access characteristics: salary>5000, age>20, and ID number>450.

A person skilled in the art may understand that the to-be-accessed table and the common expression in the SQL statement are merely two examples of the SQL statement access characteristic, and other access characteristics are not described herein. Implementations including another access characteristic fall within the protection scope of the present disclosure.

In an implementation, a preset trigger condition includes a time trigger condition and a quantity trigger condition.

(1) The time trigger condition is that, duration of the SQL statement cache queue reaches a specified time threshold.

In an embodiment, when SQL statements are received, the SQL statement dispatcher 215 groups the SQL statements based on a same access characteristic. When a first SQL statement having an access characteristic is received, a group is created based on the access characteristic, and a timer is created. Each time a following SQL statement having this access characteristic is received, the SQL statement is cached in this group. When the timer reaches a specified moment, an operation of sending an SQL statement cached in this group to the SQL statement execution engine for execution is triggered.

(2) The quantity trigger condition is that, a quantity of SQL statements in the SQL statement cache queue reaches a specified quantity threshold.

In an embodiment, the SQL statement dispatcher 215 groups the SQL statements based on a same access characteristic. When a first SQL statement having an access characteristic is received, a group is created based on the access characteristic, and a counter is created for counting SQL statements cached in the group. Each time a following SQL statement having the access characteristic is received, the SQL statement is cached in the group, and a count value of the counter is increased. When the value of the counter (the quantity of SQL statements in the group) reaches the specified quantity threshold, an operation of sending an SQL statement cached in the group to the SQL statement execution engine for execution is triggered.

It should be noted that either the time trigger condition or the quantity trigger condition may be selected as an individual trigger condition. For example, if only the quantity trigger condition is used, execution of the cached SQL statements is not triggered unless a quantity of the cached SQL statements reaches the quantity threshold. In this way, efficiency of batch execution of the SQL statements is ensured. However, in some cases, a relatively long waiting time is caused. This actually offsets an advantage of batch execution of the SQL statements. If only the time trigger condition is used, once the time threshold is satisfied, execution of the cached SQL statements is triggered. This ensures that a time period in which the SQL statements are cached in the SQL pool is not quite long, but this may also result in a problem that an effect of batch execution of the SQL statements is not reflected due to a relatively small quantity of cached SQL statements. Therefore, in an implementation, a combination of the two types of trigger conditions can be used to overcome a disadvantage caused using a single trigger condition. For example, in a scenario, a quantity of SQL statements having an access characteristic has not reached the quantity trigger condition. Because a caching time period has been relatively long, to ensure processing efficiency of the SQL statements, a time trigger condition may be set to trigger an operation of sending the cached SQL statements to the SQL execution engine 220 for execution. A special case of this implementation process is as follows. Over time, there is always only one SQL statement in a group having an access characteristic. In this case, a time trigger condition needs to be set such that after the time threshold is satisfied, the cached SQL statement is sent to the SQL execution engine 220 for execution.

When the SQL statement cache group does not satisfy the trigger condition for sending the SQL statement for execution, the SQL statement dispatcher 215 continues to group and cache SQL statements based on an access characteristic.

For example, the SQL caching pool 2151 in FIG. 2 includes two SQL statement queues. A first queue includes two SQL statements: SQL1 and SQL2, and a second queue includes four SQL statements: SQL3 to SQL6.

Further, optionally, to return an execution result of a to-be-executed SQL statement in a stored procedure to a thread executing the stored procedure to which the SQL statement belongs, the stored procedure executor 213 sends the to-be-executed SQL statement to the SQL statement dispatcher such that when caching is performed based on a same access characteristic, the SQL statement dispatcher 215 records a correspondence between the to-be-executed SQL statement in the stored procedure and the thread executing the stored procedure. In this case, after an execution result returned by the SQL statement execution engine after the SQL statement execution engine executes the SQL statement included in the task is received, the SQL statement dispatcher 215 returns, based on the correspondence between the to-be-executed SQL statement and the execution thread, the execution result to the execution thread corresponding to the SQL statement.

(F) The SQL execution engine 220 is configured to execute the SQL statements. With reference to the computer architecture 100 shown in FIG. 1A, the SQL execution engine 220 is a component, including software and hardware, in the database 150. The SQL execution engine 220 includes a processor, in the computing node, configured to receive an SQL statement, and processes the following execution process on the SQL statement on the processor. The execution process includes the following operations.

(1) Syntax check: Herein, syntax check is performed on an SQL statement to check whether the SQL statement satisfies a syntax rule. If the SQL execution engine determines that the SQL statement does not conform to the syntax rule, this piece of error information is fed back to a client.

(2) Semantic check: It is used to check whether there is an access object (for example, a table, an index, and a view) in an SQL statement and whether a user sending the SQL statement has corresponding permission.

(3) Statement parsing (Parse): It is used to parse an SQL statement, and generate a parse tree (Parse Tree) and an execution plan.

(4) Execution: It is used to execute an SQL statement and return an execution result.

The database processing architecture shown in FIG. 2 is used to dispatch a plurality of threads for a plurality of stored procedures for processing. During execution of the plurality of stored procedures, SQL statements in the execution process can be grouped and cached based on a same access characteristic. After the preset trigger condition is satisfied, SQL statements having the same access characteristic are sent to the SQL execution engine in batches such that execution efficiency of the stored procedures can be effectively improved when there are a relatively large quantity of stored procedures.

Embodiments

Figure 4A:
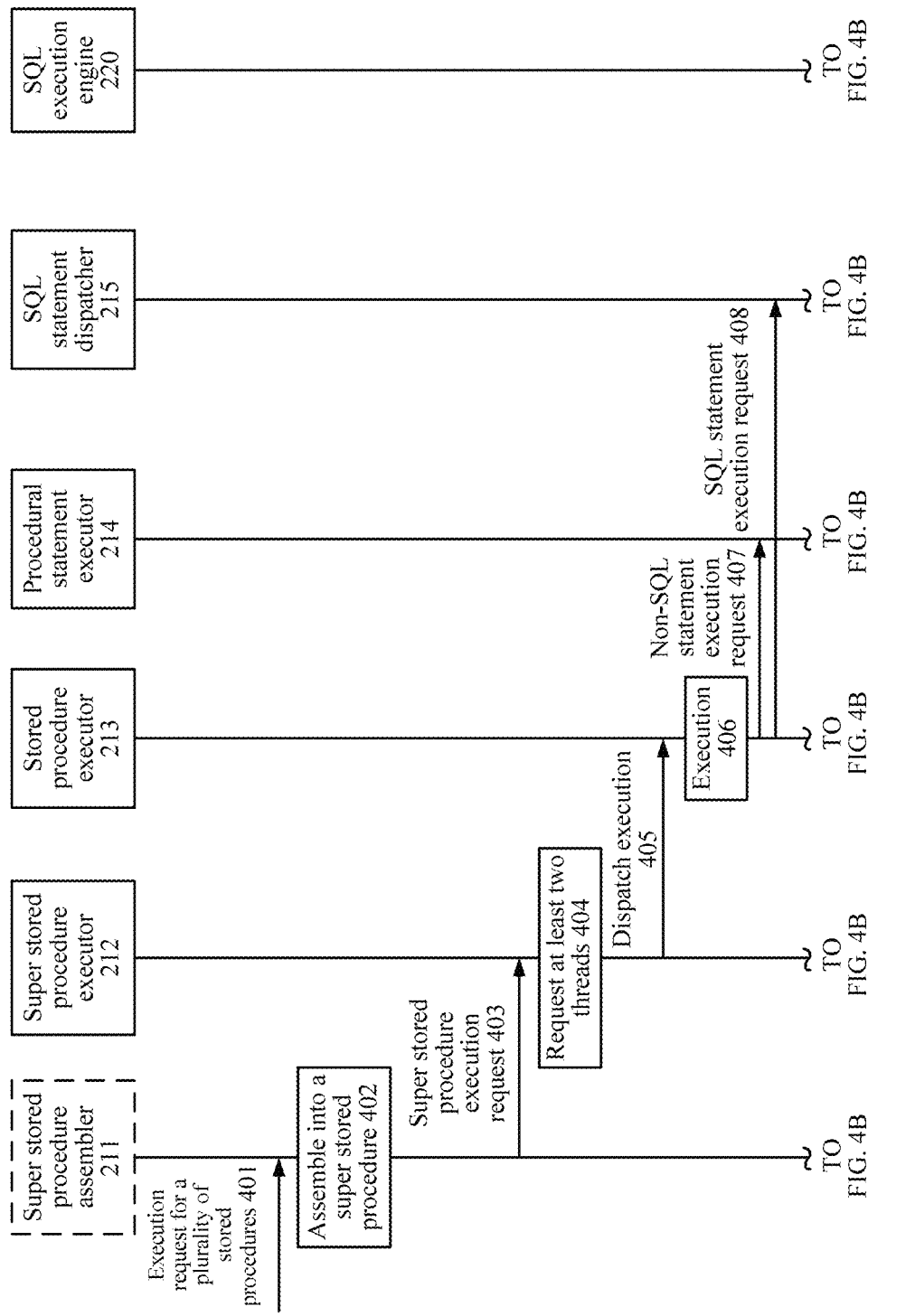
FIG. 4A and FIG. 4B are schematic flowcharts of a stored-procedure execution method according to an embodiment of the present disclosure.
Figure 4B:
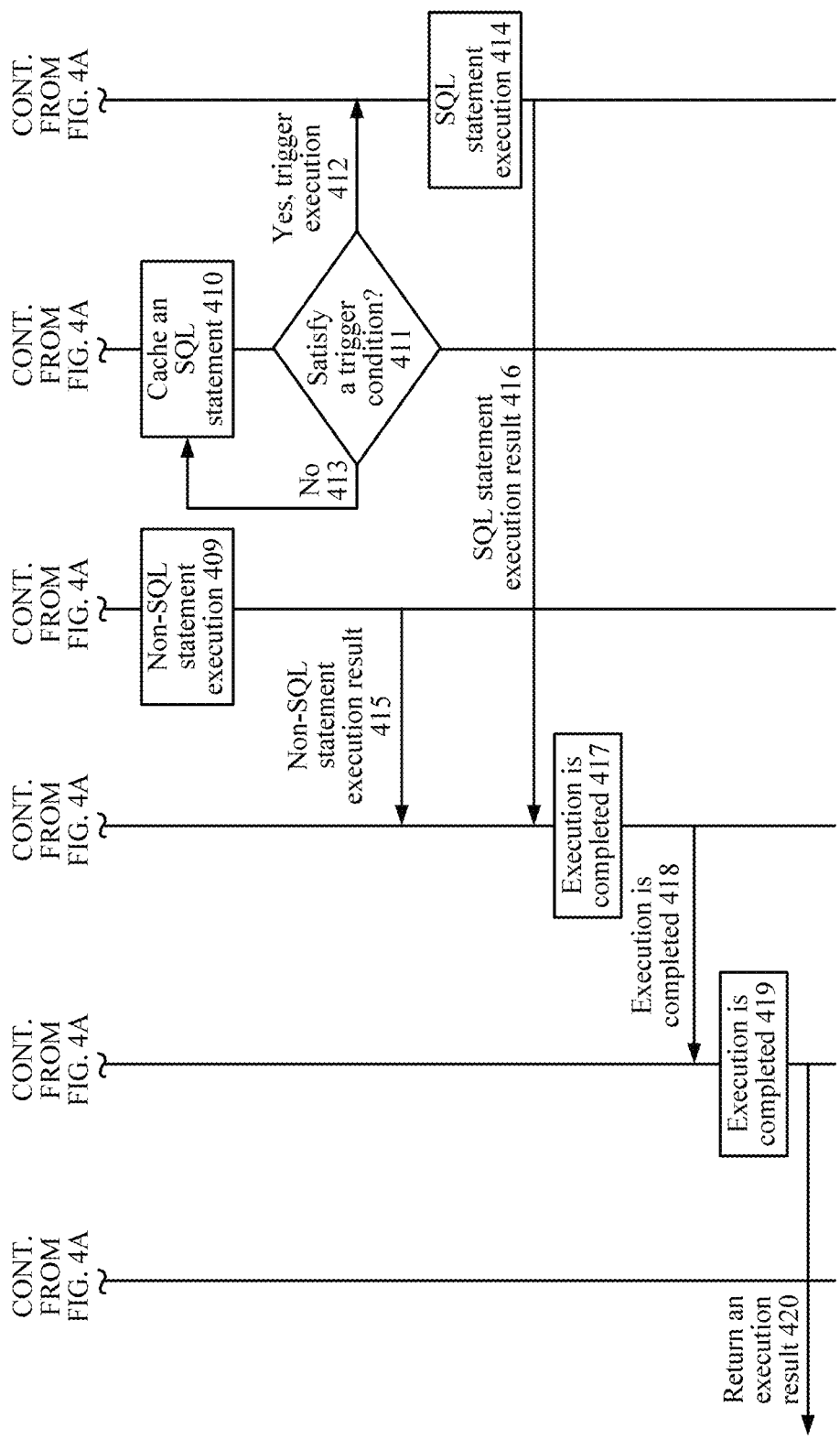

With reference to the database processing architecture in FIG. 2, FIG. 4A and FIG. 4B show a schematic flowchart of a method embodiment of the present disclosure.

Step 401: A super stored procedure assembler 211 receives an execution request for a plurality of stored procedures that is sent by a client.

The execution request for the plurality of stored procedures includes names and parameters of the plurality of stored procedures.

Optionally, after the super stored procedure assembler 211 receives at least two stored procedures, the super stored procedure assembler 211 filters the stored procedures, that is, selects stored procedures that can be executed in parallel, and assembles these stored procedures into a super stored procedure similar to the structure shown in FIG. 3. The super stored procedure includes at least some parallelizable stored procedures. For the parallelizable stored procedures, refer to the text description of the database processing architecture shown in FIG. 2, and details are not described herein again.

In an embodiment, the execution requests for the at least two stored procedures may be sent by one client or by a plurality of clients. For example, a client 1 sends an execution request for a stored procedure 1, and a client 2 sends an execution request for a stored procedure 2 and a stored procedure 3.

Step 402: The super stored procedure assembler 211 assembles the plurality of stored procedures into a super stored procedure.

That the super stored procedure assembler 211 assembles the plurality of stored procedures into one super stored procedure is optional, and the assembling can be implemented by a user. The plurality of stored procedures are assembled into the data structure shown in FIG. 3. Refer to the description of the "database processing architecture" section, and details are not described herein again.

Step 403: The super stored procedure assembler 211 sends a super stored procedure execution request to a super stored procedure executor 212.

Step 404: The super stored procedure executor 212 requests at least two threads.

For an implementation, refer to the description of the super stored procedure executor 212 in the "database processing architecture" section, and details are not described herein again.

Step 405: The super stored procedure executor 212 dispatches the plurality of stored procedures included in the super stored procedure to the at least two requested threads.

For an implementation, refer to the description of the super stored procedure executor 212 in the "database processing architecture" section, and details are not described herein again.

Step 406: A stored procedure executor 213 executes a stored procedure.

It should be noted that step 406 to step 417 are described using execution of one stored procedure as an example. For the plurality of stored procedures, each stored procedure executor performs processing based on a similar process, and details are not described herein again.

Step 407: During execution of a procedural statement, the stored procedure executor 213 sends a procedural statement execution request to a procedural statement executor 214, and step 409 is executed.

For an implementation, refer to the description of the procedural statement executor 214 in the "database processing architecture" section, and details are not described herein again.

Step 408: During execution of an SQL statement, the stored procedure executor 213 sends an SQL statement execution request to an SQL statement dispatcher, and step 410 is executed.

For an implementation, refer to the description of the SQL statement dispatcher 215 in the "database processing architecture" section, and details are not described herein again.

Step 409: The procedural statement executor 214 executes the procedural statement, and step 415 is executed.

For an implementation, refer to the description of the procedural statement executor 214 in the "database processing architecture" section, and details are not described herein again.

Step 410: The SQL statement dispatcher 215 receives the SQL statement execution request, and extracts the to-be-executed SQL statement for caching.

For an implementation, refer to the description of the SQL statement dispatcher 215 in the "database processing architecture" section, and details are not described herein again.

Further, during execution of step 410, when receiving the to-be-executed SQL statement, and grouping and caching the SQL statement based on a same access characteristic, the SQL statement dispatcher 215 records a correspondence between the SQL statement and an execution thread. The execution thread is a thread executing a stored procedure to which the SQL statement belongs. The correspondence between the SQL statement and an execution thread is recorded such that after execution of the SQL statement is completed, an execution result can be returned to the thread executing the stored procedure to which the SQL statement belongs, and the thread can be woken up to continue to execute another statement of the stored procedure. When execution of the stored procedure is completed, an execution result is returned to the client or another stored procedure.

Step 411: The SQL statement dispatcher 215 determines whether an SQL statement execution trigger condition is satisfied, if a determining result is that the SQL statement execution trigger condition is satisfied, step 412 is executed, or if a determining result is that the SQL statement execution trigger condition is not satisfied, step 413 is executed.

For an implementation, refer to the description of the SQL statement dispatcher 215 in the "database processing architecture" section, and details are not described herein again.

Step 412: Trigger execution of the cached SQL statement, and step 414 is executed.

For an implementation, refer to the description of the SQL statement dispatcher 215 in the "database processing architecture" section, and details are not described herein again.

Step 413: Continue to cache an SQL statement.

For an implementation, refer to the description of the SQL statement dispatcher 215 in the "database processing architecture" section, and details are not described herein again.

Step 414: An SQL execution engine 220 executes the sent SQL statement, and step 416 is executed.

For an implementation, refer to the description of the SQL execution engine 220 in the "database processing architecture" section, and details are not described herein again.

Step 415: The procedural statement executor 214 returns an execution result of the procedural statement to the stored procedure executor 213.

For an implementation, refer to the description of the procedural statement executor 214 in the "database processing architecture" section, and details are not described herein again.

Step 416: The SQL execution engine 220 sends an execution result 416 of the SQL statement to the stored procedure executor 213.

For an implementation, refer to the description of the SQL statement dispatcher 215 in the "database processing architecture" section, and details are not described herein again.

Further, after receiving the execution result returned by the SQL execution engine 220 after the SQL execution engine 220 executes the to-be-executed SQL statement, the SQL execution engine 220 returns, based on the correspondence between the SQL statement and an execution thread, the execution result of the SQL statement to the execution thread corresponding to the SQL statement.

Step 417: The stored procedure executor 213 completes execution of the stored procedure.

In an implementation, the stored procedure executor 213 executes statements (including the SQL statements and the procedural statements) of the entire stored procedure in a sequential execution manner.

Step 418: The stored procedure executor 213 sends an execution result of the stored procedure to the super stored procedure executor 212.

In an embodiment, after execution of one stored procedure is completed, the stored procedure executor 213 returns the result to the super stored procedure executor 212. Then, a thread occupied by the stored procedure executor 213 may be dispatched to execute another stored procedure.

Step 419: The super stored procedure executor 212 completes execution of the super stored procedure including the plurality of stored procedures.

In an embodiment, after the stored procedures included in the super stored procedure are all executed, execution results of all the stored procedures are collected.

It should be noted that, in an actual scenario, in a task that is sent by the client and that includes at least two stored procedures, there is a read-write conflict or a write-write conflict between some stored procedures (for example, the stored procedure 1) and another stored procedure (for example, stored procedures 2, 3, and 4) to a same piece of data, and therefore these stored procedures cannot be executed in parallel. In this case, after the stored procedures 2, 3, and 4 are executed based on the solution provided in this embodiment of the present disclosure, a thread may be separately dispatched to execute the stored procedure 1. This implementation of separately executing such a stored procedure that cannot be executed in parallel with another stored procedure does not affect beneficial effects achieved by this embodiment of the present disclosure.

Step 420: The super stored procedure executor 212 returns an execution result to the client.

In an embodiment, after collecting the execution results of all the stored procedures, the super stored procedure executor 212 returns the execution results to the client that sends the plurality of stored procedures.

According to the foregoing manner, a plurality of threads are requested to execute the task including the at least two stored procedures. This can increase a processing speed of the stored procedures. The SQL statements having the same access characteristic are cached by group such that when the preset trigger condition is satisfied, the SQL statement execution engine is called to execute, in batches, statements that are in an SQL cache group and that satisfy the preset trigger condition to improve execution efficiency of the plurality of stored procedures.

Figure 5:
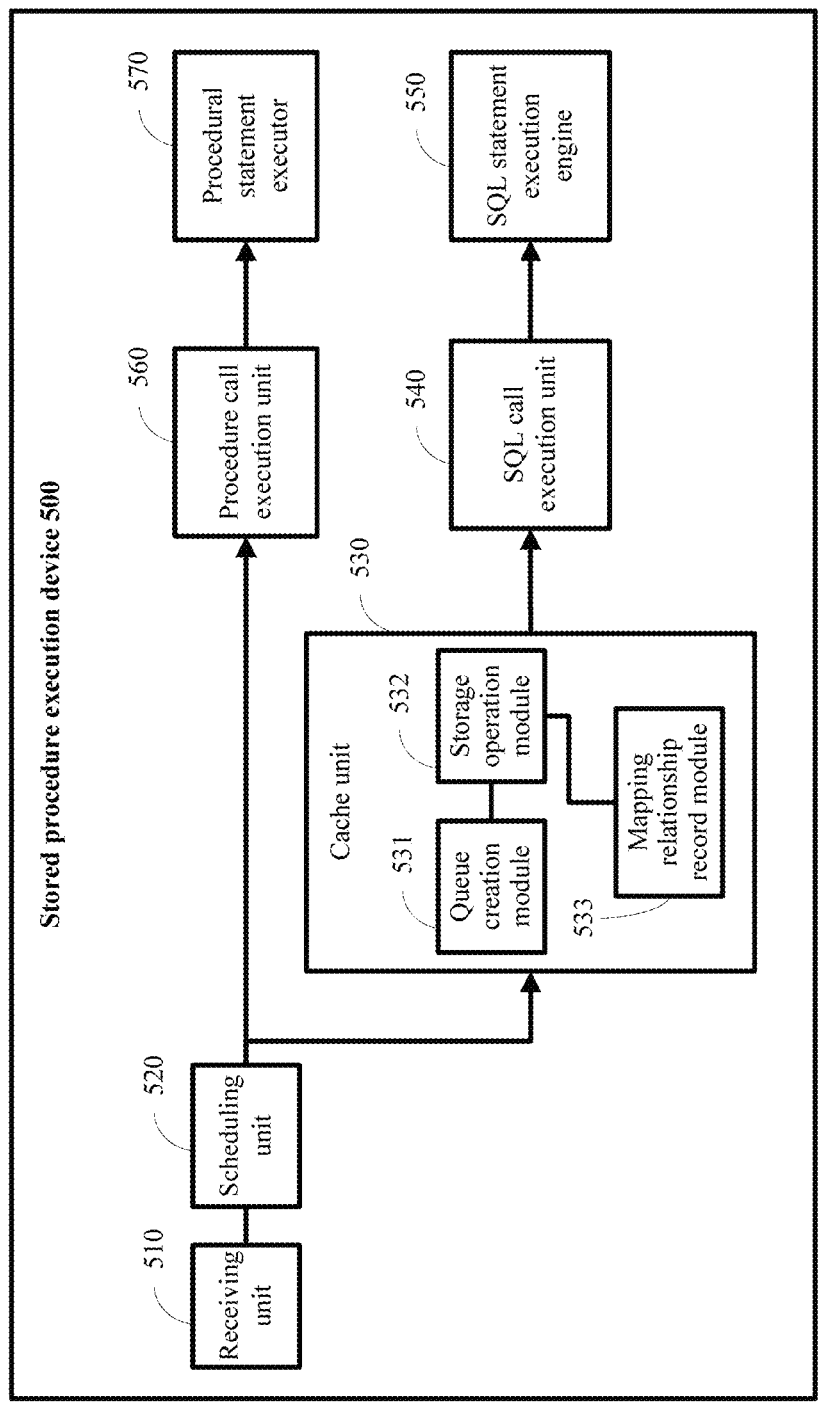
FIG. 5 is a schematic diagram of the composition of a stored-procedure execution device according to an embodiment of the present disclosure.

FIG. 5 is a structural diagram of a stored-procedure execution device. In an implementation, the execution device may be integrated in a database management system to optimize execution efficiency of a task including at least two stored procedures. The execution device 500 includes a receiving unit 510, a scheduling unit 520, a cache unit 530, and an SQL call execution unit 540.

The receiving unit 510 is configured to receive an execution request, where the execution request is used to request to execute a task including at least two stored procedures.

The execution request may be from a client or from another stored procedure. The receiving unit 510 may be a physical port, or may be a logical interface used to receive a signal, or may be a combination of both. With reference to a diagram of the database processing architecture applied in the embodiments of the present disclosure, the receiving unit 510 is corresponding to an interface of a database engine 200 and the client or an API interface associated with another stored procedure.

The scheduling unit 520 is configured to request at least two threads, and dispatch each stored procedure in the task to one of the at least two threads for processing.

In an implementation, the scheduling unit 520 is corresponding to a resource request component in the database management system, and is responsible for requesting a processing resource for the to-be-executed task including the at least two stored procedures. The scheduling unit 520 is corresponding to the super stored procedure executor 212 in the database processing architecture shown in FIG. 2. In an operation, the scheduling unit 520 requests the processing resource from an operating system in a server running on the database management system, and after receiving the request, the operating system allocates a corresponding processing resource based on available processing resources. The processing resource may be a thread, a process, or a processing resource that has another granularity and that is available for scheduling. One thread is dispatched to each stored procedure for execution. In an implementation, during execution of an executive program of the stored procedure, a plurality of stored-procedure execution instances are created, each execution instance is corresponding to one thread, and one thread may be dispatched to execute a plurality of stored procedures. From this point of view, processing of a plurality of threads is a parallel execution process. For one thread, when a stored procedure 1 is executed, the thread needs to wait for an execution result of an SQL statement. In this case, the thread is in a waiting state, and the thread can be used to execute another stored procedure. In this way, a process in which one thread executes a plurality of stored procedures becomes a parallel execution process.

The cache unit 530 is configured to receive SQL statements sent by the at least two threads when the at least two threads execute the stored procedures included in the task, and group and cache the received SQL statements based on a same access characteristic.

In an implementation, the cache unit is a storage space allocated by the operating system. In this embodiment of the present disclosure, the cache unit 530 is corresponding to the SQL pool 2151 in the database processing architecture shown in FIG. 2 and implements cache control logic for an SQL statement. In an embodiment, the cache unit 530 may be implemented using a cache unit in a processor. When the processor executes the stored procedure, if it is determined that a statement in the stored procedure is an SQL statement, under control of the cache control logic, the to-be-executed SQL statements are grouped and cached based on an access characteristic. In addition, the cache unit 530 may also be implemented using a memory and a memory controller in the server on which the database management system is located. When the processor executes a stored procedure, if it is determined that a statement in the stored procedure is an SQL statement, under control of the memory controller, the to-be-executed SQL statements are grouped and cached in a pre-allocated memory space based on an access characteristic.

The SQL call execution unit 540 is configured to, when a preset trigger condition is satisfied, call an SQL statement execution engine to execute the SQL statement in the SQL statement cache group.

In an implementation, the SQL call execution unit 540 is corresponding to the SQL statement dispatcher 215 in FIG. 2, that is, determines whether the SQL statement group satisfies the trigger condition of the SQL execution engine. For an execution process, refer to FIG. 2 and the corresponding description related to the SQL statement dispatcher in the database processing architecture. In terms of implementation, the SQL call execution unit 540 may be implemented using a logic circuit, or may be implemented by the processor to execute determining logic code.

Further, the cache unit 530 includes a queue creation module 531 and a storage operation module 532.

The queue creation module 531 is configured to create different SQL statement cache queues based on different SQL statement access characteristics.

The queue creation module 531 is corresponding to a function of an SQL pool control component of the SQL statement dispatcher in the database processing architecture in FIG. 2. The queue creation module 531 may be implemented by the processor to run code of a queue creation function, or may be implemented using a logic circuit. In an implementation, each time an SQL statement having an access characteristic is received, the queue creation module 531 may create a storage area and add a logical tag to identify the area to store SQL statements having a same access characteristic.

The storage operation module 532 is configured to determine an access characteristic of the received SQL statement, and cache the received SQL statement to an SQL statement cache queue having an access characteristic same as that of the received SQL statement.

The storage operation module 532 is corresponding to a functional component that is in the SQL statement dispatcher in the database processing architecture shown in FIG. 2 and that implements a storage operation. According to different implementations of the cache unit 530, the storage operation module 532 may have different implementation forms. When the cache unit 530 is implemented using the cache unit of the processor, the storage operation module 532 may be implemented as a cache control logic circuit. When the cache unit 530 is implemented using the memory, the storage operation module 532 may be implemented as a memory control logic circuit.

Further, the SQL statement access characteristic includes a to-be-accessed table.

In an embodiment, the SQL statement access characteristic may be completed using a component that is in the database management system and that implements an SQL statement analysis function. For example, content in a FROM sub-statement of an SQL statement can be used to identify a table accessed by the SQL statement.

Further, the SQL statement access characteristic includes a common expression in an SQL statement.

In an embodiment, the common expression is completed using the component that implements the SQL statement analysis function. For example, the common expression in this SQL statement may be determined based on content indicated by a sub-statement after where in the SQL statement. For example, in the following SQL statement, Select name from employee where salary>5000, after where, salary>5000 is a common expression in this SQL statement.

Further, the preset trigger condition includes that duration of the SQL statement cache queue reaches a specified time threshold, or a quantity of SQL statements in the SQL statement cache queue reaches a specified quantity threshold.

In an embodiment, the foregoing preset trigger condition may be pre-written into the storage operation module 532. Corresponding to the database processing architecture in FIG. 2, the preset trigger condition may be written into a cache unit of the SQL statement dispatcher. It should be noted that, with the two preset trigger conditions, a timer and/or a counter need/needs to be configured in the SQL statement dispatcher. The timer and/or counter may be implemented using a hardware logic circuit or using software code.

Further, the execution device 500 further includes a procedure call execution unit 560, configured to receive procedural statements sent by the at least two threads when the at least two threads execute the at least two stored procedures, and send the procedural statements to a procedural statement executor 570 for execution.

The procedure call execution unit 560 is a logical component responsible for determining the procedural statement. The procedure call execution unit 560 is corresponding to a procedural statement determining module in the stored procedure executor 213 of the database processing architecture of FIG. 2. In an implementation, the procedure call execution unit 560 may include a syntax analysis component, a semantic analysis component, and the like.

The procedural statement executor 570 is a logical component responsible for executing the procedural statement. In an embodiment, the procedural statement executor 570 may be implemented by running procedural statement execution code by the processor.

Further, the cache unit 530 further includes a mapping relationship record module 533, configured to, when the SQL statement sent by the at least two threads when the at least two threads execute the processing is received, and the received SQL statement is cached, a correspondence between the SQL statement and an execution thread is recorded. The execution thread is a thread executing a stored procedure to which the SQL statement belongs.

The mapping relationship record module 533 is corresponding to a component of the SQL statement dispatcher 215 in the database processing architecture shown in FIG. 2. The correspondence between the SQL statement and an execution thread may be recorded in a cache or a memory, pre-allocated like the SQL pool, of the processor.

Further, the SQL call execution unit 540 is further configured to, after an execution result is obtained after the SQL statement execution engine executes the to-be-executed SQL statement, return, based on the correspondence between the to-be-executed SQL statement and an execution thread, the execution result to the execution thread corresponding to the SQL statement.

In an embodiment, the SQL call execution unit 540 is corresponding to a component that is in the SQL statement dispatcher 215 of the database processing architecture of FIG. 2 and that is responsible for returning an SQL result. The SQL call execution unit 540 uses the SQL statement to call the mapping relationship record module 533 to query and obtain an identifier of the execution thread, and returns the SQL execution result to the corresponding execution thread.

Figure 6:
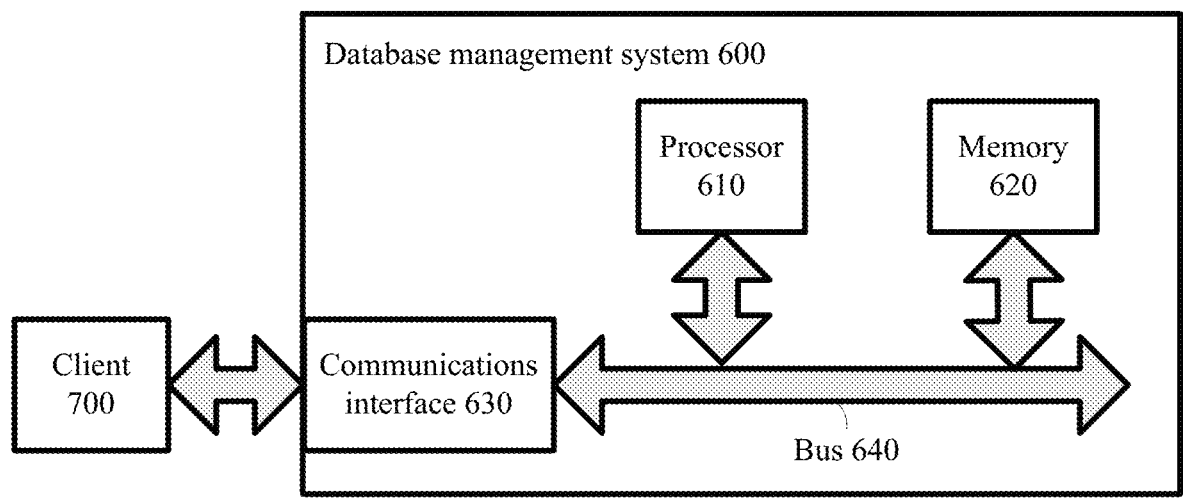
FIG. 6 is a schematic diagram of the composition of a database management system according to an embodiment of the present disclosure.

FIG. 6 shows a database management system 600 according to the present disclosure, including a processor 610, a memory 620, a communications interface 630, and a bus 640. The processor 610, the memory 620, and the communications interface 630 communicate with each other using the bus 640. The memory 620 is configured to store an execution instruction. The communications interface 630 is configured to communicate with a client 700, and when the client 700 sends an execution request, and the execution request is used to request to execute at least two stored procedures, the processor 610 executes the execution instruction stored in the memory 620 such that the database management system 600 executes the stored-procedure execution method according to any implementation of the method embodiment.

An embodiment of the present disclosure further provides a computer program product. The computer program product includes computer program code, and when the computer program code is executed by a computer, the computer program code may enable the computer to execute steps according to any implementation of the method embodiment.

An embodiment of the present disclosure further provides a computer readable storage medium. The computer stores computer program code, and when the computer program code is executed by a computer, the computer program code may enable the computer to execute steps according to any implementation of the method embodiment.

Method or algorithm steps described with reference to the content disclosed in the present disclosure may be implemented by hardware, or may be implemented by a processor by executing a software instruction. The software instruction may include a corresponding software module. The software module may be stored in a RAM memory, a flash memory, a ROM memory, an erasable programmable read-only memory (EPROM) memory, an EEPROM memory, a register, a hard disk, a removable hard disk, a CD-ROM, or any other form of storage medium well-known in the art. For example, a storage medium is coupled to a processor such that the processor can read information from the storage medium or write information into the storage medium. Certainly, the storage medium may be a component of the processor. The processor and the storage medium may be located in the Application Specific Integrated Circuit (ASIC). In addition, the ASIC may be located in user equipment. Certainly, the processor and the storage medium may exist in the user equipment as discrete components.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A stored-procedure execution method applied to a database management system, comprising:
   receiving an execution request used to request execution of a task comprising at least two stored procedures, wherein each of the at least two stored procedures comprises a plurality of Structured Query Language (SQL) statements;
   dispatching each stored procedure in the task to one of at least two threads for execution;
   receiving, from the at least two threads, the plurality of SQL statements included in the at least two stored procedures in response to the at least two threads executing the at least two stored procedures of the task;
   caching a subset of at least two of the plurality of SQL statements having a common access characteristic into an SQL statement cache group; and
   executing an SQL statement in the SQL statement cache group in response to the SQL statement cache group satisfying a preset trigger condition.

2. The execution method according to claim 1, wherein the receiving the plurality of SQL statements, and caching the subset of at least two of the plurality of SQL statements based on the common access characteristic comprises:
   creating different SQL statement cache queues based on different SQL statement access characteristics; and
   caching an SQL statement of the plurality of SQL statements to an SQL statement cache queue of the different SQL statement cache queues, wherein the SQL statement cache queue and the SQL statement have the common access characteristic.

3. The execution method according to claim 2, wherein the common access characteristic comprises a to-be-accessed table.

4. The execution method according to claim 3, wherein the common access characteristic further comprises a common expression.

5. The execution method according to claim 2, wherein the preset trigger condition occurs in response to a duration of the SQL statement cache queue reaching a specified time threshold.

6. The execution method according to claim 2, wherein the preset trigger condition occurs in response to a quantity of SQL statements in the SQL statement cache queue reaching a specified quantity threshold.

7. The execution method according to claim 1, further comprising:
   receiving procedural statements from the at least two threads in response to the at least two threads executing the at least two stored procedures of the task;
   executing the procedural statements.

8. The execution method according to claim 1, wherein during the receiving the plurality of SQL statements, and the caching the subset of at least two of the plurality of SQL statements based on the common access characteristic, the method further comprises recording a correspondence between an SQL statement of the plurality of SQL statements and an execution thread of the at least two threads, wherein the execution thread is a thread executing a stored procedure associated with the SQL statement.

9. The execution method according to claim 8, wherein after an execution result of the SQL statement is received, the method further comprises returning an execution result to the execution thread corresponding to the SQL statement based on the correspondence between the SQL statement and the execution thread.

10. A database management system, comprising:
    a memory configured to store instructions; and
    a processor coupled to the memory and configured to execute the instructions, which cause the processor to be configured to;
       receives an execution request used to request execution of a task comprising at least two stored procedures, wherein each of the at least two stored procedures comprises a plurality of Structured Query Language (SQL) statements;
       dispatches each stored procedure in the task to one of at least two threads for execution;
       receives, from the at least two threads, the plurality of SQL statements included in the at least two stored procedures in response to the at least two threads executing the at least two stored procedures of the task;
       caches a subset of at least two of the plurality of SQL statements having a common access characteristic into an SQL statement cache group; and
       executes an SQL statement in the SQL statement cache group in response to the SQL statement cache group satisfying a preset trigger condition.

11. The database management system according to claim 10, wherein the instructions further cause the processor to be configured to:
    create different SQL statement cache queues based on different SQL statement access characteristics; and
    cache an SQL statement of the plurality of SQL statements to an SQL statement cache queue of the different SQL statement cache queues, wherein the SQL statement cache queue and the SQL statement have the common access characteristic.

12. The database management system according to claim 11, wherein the common access characteristic comprises a to-be-accessed table.

13. The database management system according to claim 12, wherein the common access characteristic further comprises a common expression.

14. The database management system according to claim 11, wherein the preset trigger condition occurs in response to a duration of the SQL statement cache queue reaching a specified time threshold.

15. The database management system according to claim 11, wherein the preset trigger condition occurs in response to a quantity of SQL statements in the SQL statement cache queue reaching a specified quantity threshold.

16. The database management system according to claim 10, wherein the instructions further cause the processor to be configured to:
    receive procedural statements from the at least two threads in response to the at least two threads executing the at least two stored procedures of the task; and
    execute the procedural statements.

17. The database management system according to claim 10, wherein the instructions further cause the processor to be configured to record a correspondence between an SQL statement of the plurality of SQL statements and an execution thread of the at least two threads, wherein the execution thread is a thread executing a stored procedure associated with the SQL statement.

18. The database management system according to claim 17, wherein the instructions further cause the processor to be configured to return an execution result to the execution thread corresponding to the SQL statement based on the correspondence between the SQL statement and the execution thread.

19. A non-transitory computer readable storage medium comprising a program code that when executed by a processor, the processor to be configured to:
   receives an execution request used to request execution of a task comprising at least two stored procedures, wherein each of the at least two stored procedures comprises a plurality of Structured Query Language (SQL) statements;
   dispatches each stored procedure in the task to one of at least two threads for execution;
   receives, from the at least two threads, the plurality of SQL statements included in the at least two stored procedures in response to the at least two threads executing the at least two stored procedures of the task;
   caches a subset of at least two of the plurality of SQL statements having a common access characteristic into an SQL statement cache group; and
   executes an SQL statement in the SQL statement cache group in response to the SQL statement cache group satisfying a preset trigger condition.

20. The non-transitory computer readable storage medium of claim 19, wherein the program code, when executed by the processor, further causes the processor to be configured to:
   create different SQL statement cache queues based on different SQL statement access characteristics; and
   cache an SQL statement of the plurality of SQL statements to an SQL statement cache queue of the different SQL statement cache queues, wherein the SQL statement cache queue and the SQL statement have the common access characteristic.

* * * * *

UNITED STATES PATENT AND TRADEMARK OFFICE
CERTIFICATE OF CORRECTION

PATENT NO. : 11,182,353 B2  
APPLICATION NO. : 16/458684  
DATED : November 23, 2021  
INVENTOR(S) : Ying et al.

Page 1 of 1

It is certified that error appears in the above-identified patent and that said Letters Patent is hereby corrected as shown below:

In the Claims

Claim 1, Column 25, Line 11: "comprises a plurality" should read "comprise a plurality"

Claim 10, Column 26, Line 23: "into an SQL" should read "to an SQL"

Claim 17, Column 26, Line 62: "threads, wherein" should read "threads, and wherein"

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*